June 5, 1934.    T. A. LARSON    1,961,500
LAYOUT INSTRUMENT
Filed Dec. 30, 1930
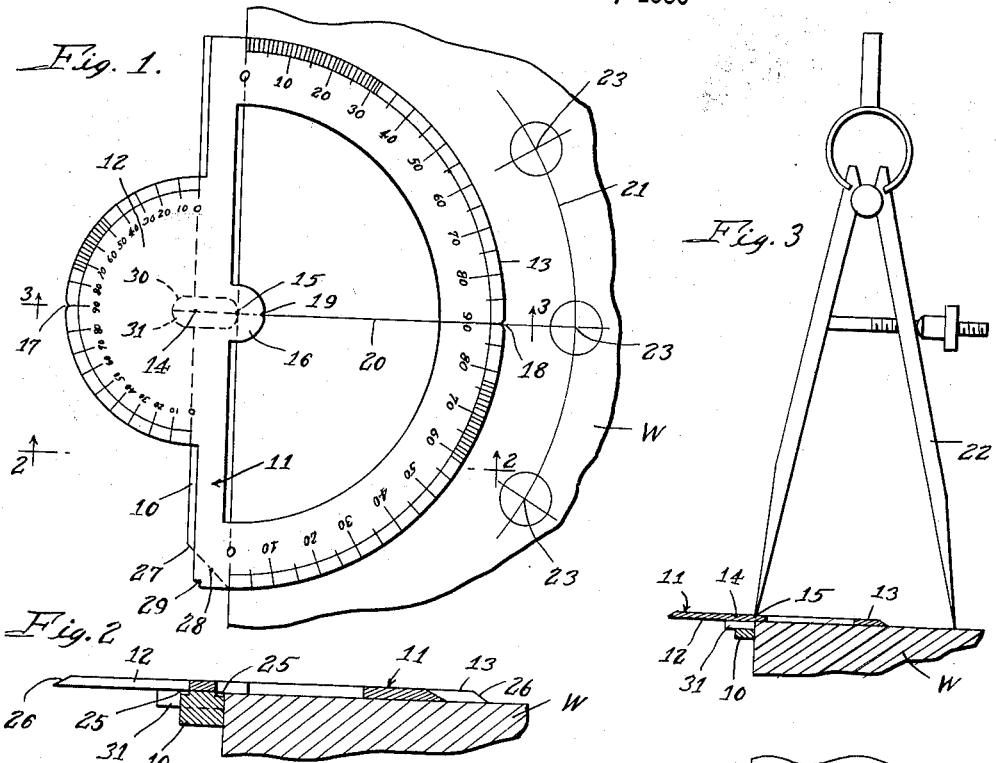
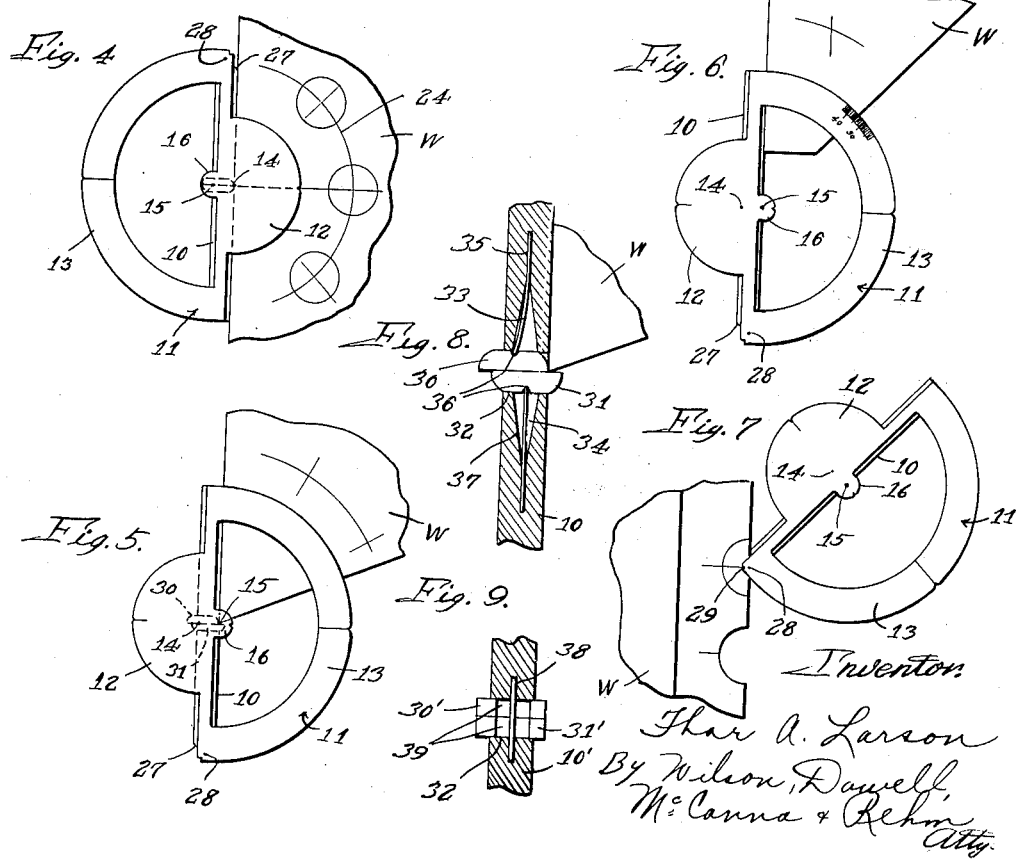
Inventor
Thor A. Larson
By Wilson, Dawell,
McCanna & Rehm
Atty.

Patented June 5, 1934

1,961,500

UNITED STATES PATENT OFFICE 1,961,500

LAYOUT INSTRUMENT

Thor A. Larson, Rockford, Ill.

Application December 30, 1930, Serial No. 505,611

10 Claims. (Cl. 33—1)

This invention relates to an instrument intended for use by tool and die makers, machinists, mechanics, and others in the laying out of work.

The principal object of my invention is to provide an instrument which is so designed and constructed that it adapts itself to use in a number of ways in laying out points accurately with reference to a predetermined point or points, scribing arcs accurately on radii measured exactly from the edge of a piece of work, and measuring or laying out angles on work. In short, the instrument of my invention is designed to take the place of several tools or instruments that would otherwise be required for doing the same class of work, and is arranged to enable the performance of these operations with a higher degree of accuracy than has been possible heretofore and likewise with much greater ease and facility.

A salient feature of the instrument of my invention lies in the ease with which it can be used in laying out work where the dimensions have to be measured exactly from a corner or edge and where arcs have to be scribed having the center at the corner or coincident with the edge. Heretofore, so far as I am aware, there have been no instruments provided for satisfactorily taking care of this kind of work and it has been rather common practice to resort to makeshifts, so that the accuracy in the laying out of such work has been very questionable.

The features of the instrument of my invention will soon appear as reference is made to the accompanying drawing, in which—

Figure 1 is a plan view of the instrument on an enlarged scale, showing one way of using it;

Fig. 2 is a vertical section taken on the line 2—2 of Fig. 1;

Fig. 3 is a section on the line 3—3 of Fig. 1 showing the instrument, normal size, and indicating how a compass is used in connection therewith for scribing;

Figs. 4-7 are plan views of the instrument, normal size, showing other uses therefor;

Fig. 8 is a horizontal sectional detail of the stops, on an enlarged scale, showing them under the conditions illustrated in Fig. 5, and Fig. 9 is a similar sectional detail showing a different construction.

The same reference numerals are applied to corresponding parts throughout the views.

Referring to Figs. 1 and 2 particularly, it will be observed that the instrument comprises a bar 10 whose opposite sides are straight edges adapted for engagement interchangeably with the edge of the piece of work designated by the letter W. The bar 10 has a plate 11 mounted thereon, which is formed to provide the opposed portions 12 and 13. The portion 12 is struck on a smaller radius than the portion 13 and is a closed or blank half round portion with its diameter exactly coincident with one straight edge of the bar 10, whereas the portion 13 is an open half round portion with its diameter exactly coincident with the other straight edge of the bar 10, the opening in the portion 13 being substantially half round as shown. Slight depressions are made at 14 and 15 marking the centers for the portions 12 and 13, respectively, and, of course, these centers exactly coincide with the straight edges of the bar 10. Opposed to the portion 12 is another closed or blank half round portion 16 concentric with the portion 13. This portion is struck on a very small radius and has the center 15 provided thereon as shown. Slight notches 17, 18, and 19 are preferably provided at mid points of the peripheries of the portions 12, 13, and 16, respectively, in line with the centers 14 and 15. This permits one to locate the instrument accurately with reference to a line scribed on the work as, for example, that indicated at 20 in Fig. 1.

From this much description it will be seen that one can place the instrument against the edge of a piece of work and line it up properly with a scribed line on the work to get the center 14 or 15 at the desired point for scribing arcs whose radii are to be measured exactly from the edge of the work. For example, the arc 21 shown in Fig. 1 can be scribed with a compass 22 using the center 15. There is no need for resorting to any makeshifts to measure from the edge of the work and scribe the arcs. The portions 12 and 13 are suitably graduated in degrees, like protractors, so that centers for holes can be marked out, as indicated at 23, accurately with reference to the center from which the arc is scribed. The portion 12 is sufficiently smaller in radius than the portion 13 so that where the arc to be scribed would fall under the portion 13, the instrument can be turned around, as shown in Fig. 4, and the center 14 used for striking such arcs, as indicated at 24. In this case again, since the portion 12 constitutes a protractor, the centers for holes to be marked out can be located accurately in a well known way, just the same as in the use of an ordinary protractor. Of course, where the arcs to be scribed are of a still smaller radius, less than the radius of the portion 12, the instrument can be turned around to permit use of the center 15. In Fig. 6, another use of the instrument is illustrated, that being where it is known that one edge of the work makes a certain angle with another edge, let us say 45°, and it is desired to strike an arc or arcs on the work from the point of intersection of those edges. In that case, it is a simple matter to place the instrument as shown and use the center mark on the instrument in scribing the arcs. Special attention is called to the fact that the bar 10 is cut away at the top thereof along both of its straight edges, as indicated at 25, Fig. 2, so that one can scribe an arc with a compass all the way to the very edge of the work without having the bar interfere with the compass running off the edge. This is found to be quite an advantage because the workman can see where the arc intersects the edge, looking at the work edgewise, the edge being notched by the compass enough to make the point clearly visible at the edge of the work. This cutting away of the bar below the level of the bottom of the plate 11 is also of advantage from the standpoint that one is not so apt to scratch the instrument with the compass. In passing, it will be observed that I have shown the peripheries of the portions 12 and 13 beveled, as appears at 26. This facilitates accurate work with the instrument.

In Fig. 1, it will be noticed that one end of the bar 10 is cut off diagonally at approximately 45°, as indicated at 27, and that a center 28 is provided on the plate 11 in the plane of the edge 27. This permits use of the instrument in the manner shown in Fig. 7, where arcs as small as or smaller than the radius of the portion 16 have to be scribed on the work or where, for any reason, it is impossible or unhandy to place the bar 10, full length, against the edge of the work. That is to say, wherever the work is too small or is of such form that the instrument could not be used in any of the ways above described the problem is solved by using the center 28 and beveled end 27 of the bar 10. A notch 29 can be provided on the plate in connection with the center 28 for the same purpose as the notches 17—19, previously mentioned, namely, to accurately locate the center with reference to a scribed line on the work.

The matter of accurately locating the instrument with respect to a corner of the work is greatly facilitated by the provision of a pair of stops 30 and 31 slidably received in a slot 32 cut transversely of the bar 10 at the middle thereof. The stops are in the form of small slides having abutting straight edges that fall exactly in line with the centers 14 and 15, as clearly appears in Fig. 1. These stops have the ends thereof made quarter-round, as shown, or beveled off on the sides so that when the bar 10 is placed against the edge of a piece of work and is slid along to bring the center 14 or 15, as the case may be, in line with the corner of the work, the one stop will be cammed out of the way, leaving the other one projecting for abutment with the corner of the work, as clearly appears in Fig. 8. Leaf springs 33 and 34 are set in slots 35 provided in the bar 10 on either side of the slot 32 and approximately at right angles thereto, and have their free ends projecting toward one another into the opposite sides of the slot 32 into notches 36 provided in the sides of the stops 30 and 31. The slots 35 are flared, as indicated at 37, to permit flexing of the free ends of the springs in either direction from a normal mid position. The springs serve normally to hold the stops in a position like that occupied by the stop 31 in Fig. 8, but are arranged to flex to permit the stops to be moved out of the way, as shown for example in the case of the stop 30 in Fig. 8. On the other hand, where the straight edge of the bar is placed full length against the edge of a piece of work as shown in Fig. 1 the both stops are depressed at the same time to an out-of-the-way position. It is obvious that with this construction it is a simple matter to locate the instrument so that either one of the centers 14 and 15 will be exactly coincident with the corner of the work, as shown in Fig. 5. The stops require no attention whatsoever, their operation being substantially automatic.

In Fig. 9, I have shown a slightly different construction in which a bar 10' has a slot 32 cut therein to accommodate two stops 30' and 31' whose abutting edges are on a line exactly coinciding with the centers 14 and 15 as in the case of the other stops 30 and 31. In this case, however, no springs are used in connection with the stops; they are simply held in the slot by means of a pin 38 set in the bar crosswise of the slot 32 and extending crosswise with reference to the stops, in notches 39 provided therein. These notches are just long enough so that one can push the one stop out of the way after the manner of the stop 30 in Fig. 8 when the other stop is to be used. Of course, where the instrument is being used as in Fig. 1 both stops will be pushed out of the way as the bar is placed against the edge of the work.

It is believed the foregoing description conveys a clear understanding of my invention. The appended claims have been drawn with a view to covering all legitimate modifications and adaptations.

I claim:

1. An instrument of the class described comprising a bar having a straight edge for engagement with the edge of a piece of work, a plate on the bar and of substantially half round form, the diameter of which coincides with the straight edge of the bar, means providing thereon a center point coincident with the center of the half round plate and in the plane of the aforesaid straight edge, one end of the bar being formed at an acute angle with respect to the straight edge, the plate having the diametrical portion thereof projecting beyond said end and having a center point thereon in a plane coincident with said end.

2. An instrument of the class described comprising a body member formed to provide a straight edge portion having a straight edge for engagement with the edge of a piece of work, and a plate portion extending from the top of the straight edge portion and of substantially half round form, the diameter of which coincides with the aforesaid straight edge, means providing a center point coincident with the center of the half round plate portion and in the plane of the aforesaid straight edge, said straight edge portion being provided with a transverse slot at the middle thereof, and a pair of stops slidably mounted in said slot, said stops having straight edges abutting one another in a plane at right angles to the straight edge and coincident with the center point.

3. An instrument of the class described comprising a body member formed to provide a straight edge portion having a straight edge for engagement with the edge of a piece of work, and a plate portion extending from the top of the straight edge portion and of substantially half round form, the diameter of which coincides with the aforesaid straight edge, means providing a center point coincident with the center of the half round plate portion and in the plane of the aforesaid straight edge, said straight edge portion being provided with a transverse slot at the middle thereof, and a pair of stops slidably mounted in said slot, said stops having straight edges abutting one another in a plane at right angles to the straight edge and coincident with the center point, and spring means normally urging said stops to a position where they both project from the straight edge, said stops having the backs of the projecting portions thereof formed cam-shaped for the purpose described.

4. An instrument of the class described comprising a body formed to provide a bar portion having the opposite sides thereof constituting straight edges adapted for engagement interchangeably with the edge of a piece of work, and a plate portion on said bar and formed to provide a substantially half round portion of one radius having the diameter thereof coinciding with the one straight edge of the bar and a diametrically opposed substantially half round portion of a larger radius having its diameter coinciding with the other straight edge of the bar, and two center points on the plate one of which coincides with the center of the first portion and is in the plane of the one straight edge of the bar and the other of which coincides with the center of the other half round portion and is in the plane of the other straight edge of the bar.

5. An instrument as set forth in claim 4 wherein the larger half round portion is provided with an unobstructed substantially half round opening of a larger size than the other half round portion, said plate being formed at the approximate center thereof with a third and still smaller half round portion concentric with said opening and having one of the two center points thereon, said center point cooperating with the half round opening to permit striking arcs on the surface of the work and smaller than the radius of the larger half round plate portion, the arcs being from centers coincident with the edge of the work when the straight edge is disposed in abutment with the edge of the work.

6. A device as set forth in claim 4 wherein said bar is provided with a transverse slot at the middle thereof, the instrument including a pair of stops slidably mounted in said slot, said stops having straight edges abutting one another in a plane at right angles to the straight edges of the bar and coincident with the center points.

7. A device as set forth in claim 4 wherein said bar is provided with a transverse slot at the middle thereof, the instrument including a pair of stops slidably mounted in said slot, said stops having straight edges abutting one another in a plane at right angles to the straight edges of the bar and coincident with the center points, and spring means normally urging said stops to a position where they both project from the straight edges, said stops having the backs of the projecting portions thereof formed cam-shaped for the purpose described.

8. An instrument as set forth in claim 4 wherein one end of the bar is formed at an acute angle with respect to the straight edges, the plate having the diametrical portion thereof projecting beyond said end and having a center point thereon in a plane coincident with said end.

9. An instrument of the class described comprising a bar having a straight edge for engagement with the edge of a piece of work, a plate on the bar and of substantially half round form, the diameter of which coincides with the straight edge of the bar, said plate being formed to provide an unobstructed concentric substantially half round opening therein which reaches beyond the plane of the straight edge, whereby to expose a portion of the top surface of said bar adjacent the straight edge, said plate being further formed to provide a central portion projecting into the half round opening and having thereon a center point recess coincident with the center for the half round plate and in a plane coincident with the straight edge of the bar, said center point cooperating with the half round opening to permit striking arcs on the surface of the work and smaller than the radius of the half round plate, the arcs being from centers coincident with the edge of the work when the straight edge is disposed in abutment with the edge of the work.

10. An instrument of the class described comprising a body formed to provide a straight edge portion having a straight edge for engagement with the edge of a piece of work, and a plate portion projecting from the top of the straight edge portion and of substantially half round form, the diameter of the plate portion coinciding with the aforesaid straight edge, the plate portion being formed to provide an unobstructed concentric substantially half round opening therein reaching at least to the aforesaid diameter, and being further formed to provide a central portion having thereon a center point recess coincident with the center for the half round plate portion and in a plane coincident with the aforesaid straight edge, said center point cooperating with the half round opening to permit striking arcs on the surface of the work and smaller than the radius of the half round plate portion, the arcs being from centers coincident with the edge of the work when the straight edge is disposed in abutment with the edge of the work.

THOR A. LARSON.